United States Patent [19]

Niikura et al.

[11] Patent Number: 4,997,009
[45] Date of Patent: Mar. 5, 1991

[54] ACCUMULATOR

[75] Inventors: Yoshiharu Niikura; Akira Kebukawa, both of Yokohama, Japan

[73] Assignee: NHK Spring Co., Ltd., Yokohama, Japan

[21] Appl. No.: 502,509

[22] Filed: Mar. 30, 1990

[30] Foreign Application Priority Data

Apr. 5, 1989 [JP] Japan .................................. 1-86646

[51] Int. Cl.$^5$ ............................................ F16L 55/04
[52] U.S. Cl. ...................................... 138/30; 138/31; 188/314; 60/413
[58] Field of Search ..................... 138/30, 31; 188/314; 267/64.27, 122; 251/356; 60/413

[56] References Cited

U.S. PATENT DOCUMENTS

| | | | |
|---|---|---|---|
| 4,614,255 | 9/1986 | Morita et al. | 188/315 |
| 4,815,706 | 3/1989 | Feuling | 251/356 |
| 4,828,231 | 6/1989 | Fukumura et al. | |
| 4,921,224 | 5/1990 | Fukumura et al. | 188/314 |

FOREIGN PATENT DOCUMENTS

| | | |
|---|---|---|
| 62-131136 | 8/1987 | Japan . |
| 63-195102 | 12/1988 | Japan . |
| 996768 | 9/1986 | U.S.S.R. . |
| 588332 | 5/1947 | United Kingdom . |
| 603363 | 6/1948 | United Kingdom . |

Primary Examiner—Paul T. Sewell
Assistant Examiner—M. D. Patterson
Attorney, Agent, or Firm—Frishauf, Holtz, Goodman & Woodward

[57] ABSTRACT

In the interior of the housing of an accumulator, a metallic bellows and a self-seal mechanism are arranged. The metallic bellows partitions the interior of the housing into a gas chamber and a liquid chamber. The self-seal mechanism includes an elastic seal member and a face which the elastic seal member opposes. When the bellows is compressed to the predetermined extent due to introduction of a compressed gas into the gas chamber, the elastic seal member is brought into contact with the face, thus closing a flow port. The elastic seal member has a slanted face, so that a wedge-shaped liquid guide gap is produced when the elastic seal member is in contact with the face. When, in this condition, the compressed liquid is introduced into the flow port, part of the liquid enters the liquid guide gap, thus permitting the seal member to easily separate from the face.

10 Claims, 8 Drawing Sheets

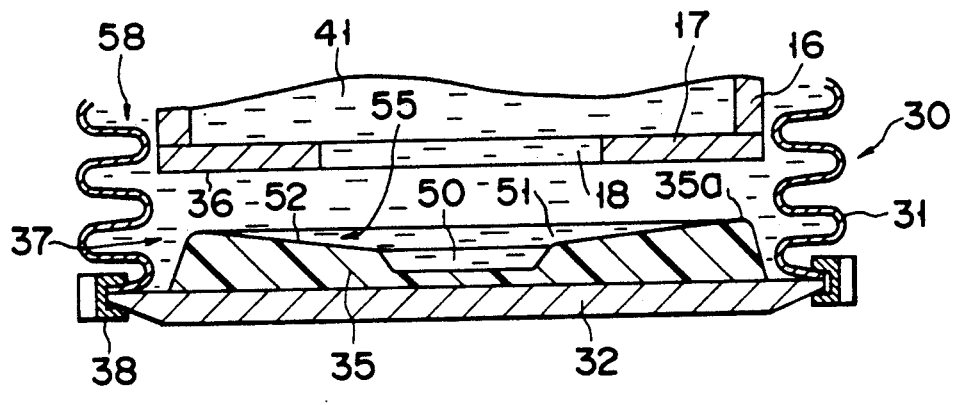
F I G. 5
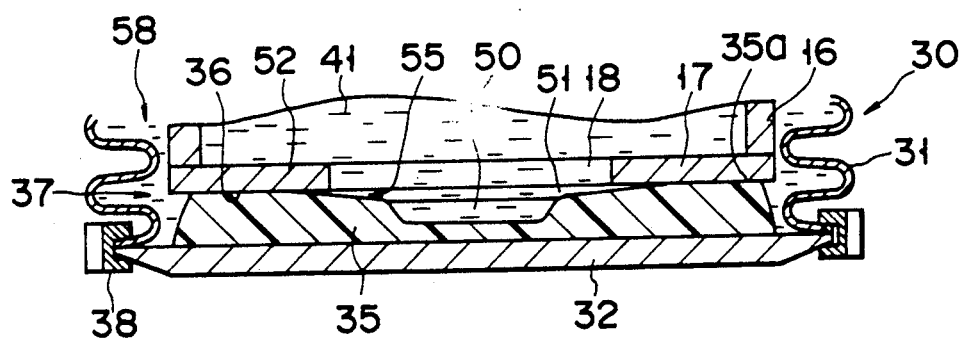
F I G. 6
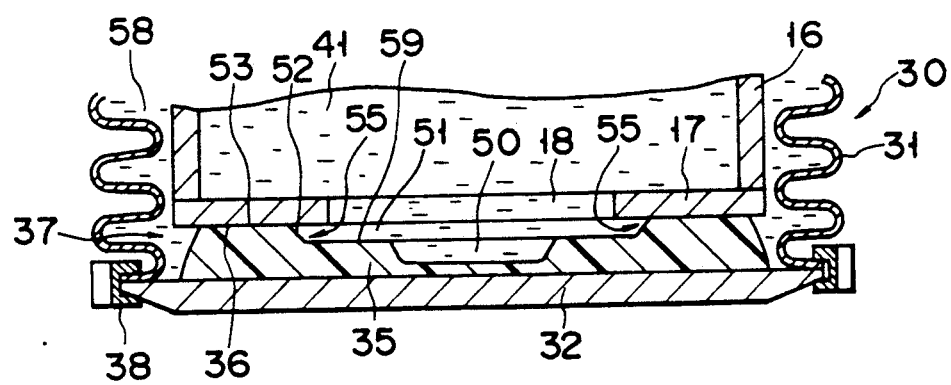
F I G. 7

ACCUMULATOR

BACKGROUND OF THE INVENTION

1. Field of the Invention

The present invention relates to an accumulator which is employed in various types of hydraulic devices for the absorption of pulsation or in hydropneumatic suspension systems for motor vehicles.

2. Description of the Related Art

Various types of accumulators adapted for their respective purposes have hitherto been put to practical use. For example, there is a type wherein a liquid chamber filled with an oil and a gas chamber containing a compressed gas are defined in the interior of a hollow housing. In a recently-developed accumulator of this type, a metallic bellows is employed to provide a partition between the liquid and gas chambers. The bellows is compressible or extensible in the axial direction of the housing, and one of the liquid and gas chambers is defined inside the bellows, with the other chamber defined outside of the bellows. The bellows is expanded or compressed in accordance with a variation in the pressure in either the liquid or gas chamber.

The inventors of the present invention developed an accumulator which is of a type employing a metallic bellows and which is provided with a self-seal mechanism for preventing the bellows from being deformed beyond an allowable extent when the gas chamber is charged with a gas.

In this accumulator, an inner cylinder and a metallic bellows are arranged coaxial inside a housing, and the bellows partitions the interior of the housing into liquid and gas chambers. The accumulator has an internal flow port through which a liquid flows into or out of the liquid chamber when the bellows is compressed or expanded. The flow port can be opened or closed by the self-seal mechanism. The self-seal mechanism is made up of: a support seat having the flow port formed therein; and an elastic seal member formed of rubber or the like and arranged to face the support seat. If the bellows is deformed beyond a predetermined stroke when the gas chamber is charged with a gas, the seal member closes the flow port, with the result that a liquid is confined to a backup liquid chamber defined between the bellows and the inner cylinder. Since a liquid is substantially an incompressible fluid, the liquid confined to the backup liquid chamber uniformly supports the entire wall of the bellows. As a result, the bellows is prevented from being excessively deformed.

In the process of the development of the abovementioned accumulator, the inventors found out that the accumulator required improvement in the point below:

If the self-seal mechanism closes itself at the time of the gas introduction into the gas chamber, the seal member is pressed strongly against the support seat. In some cases, the seal member may cling to the support seat. If the seal member clings to the support seat, the seal member does not easily separate from the support member, even when a liquid is introduced from a hydraulic pump or the like into the interior of the housing after the gas introduction. Since, therefore, the self-seal mechanism does not smoothly change from the closed state to the open state, it does not have satisfactory responsiveness.

SUMMARY OF THE INVENTION

Accordingly, an object of the present invention is to provide an accumulator which incorporates a self-seal mechanism and which enables the seal member of the mechanism to instantaneously separate from its opposite face, to thereby smoothly change the self-seal mechanism from the closed state to the open state.

An accumulator which the present invention provides to achieve this object comprises: a bellows for providing a partition between the gas and liquid chambers; and a self-seal mechanism which closes a flow port if the bellows deflects more than a predetermined extent due to the pressure of the gas introduced into the gas chamber. The self-seal mechanism includes an elastic seal member formed of rubber or the like and provided for at least one of the support seat and the end plate of the bellows. The seal member and its opposite face defines a wedge-shaped liquid guide gap therebetween. The shape of this liquid guide gap is determined such that part of the liquid introduced into the housing can enter the contact region between the elastic seal member and the opposite face in the state where the self-seal mechanism is kept closed due to the pressure of the gas introduced into the gas chamber.

In the accumulator mentioned above, the elastic seal member can easily or instantaneously separate from its corresponding face when a liquid pressurized by a pump or the like is introduced into the housing. Therefore, the self-seal mechanism can be changed from the closed state to the open state very smoothly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a sectional view illustrating a modification of the elastic seal member;

FIG. 6 is a sectional view illustrating the state where the elastic seal member shown in FIG. 5 is in contact with its corresponding face;

FIGS. 7 through 9 are sectional views illustrating modifications of the self-seal mechanism;

DETAILED DESCRIPTION OF THE PREFERRED EMBODIMENTS

Figure 1:
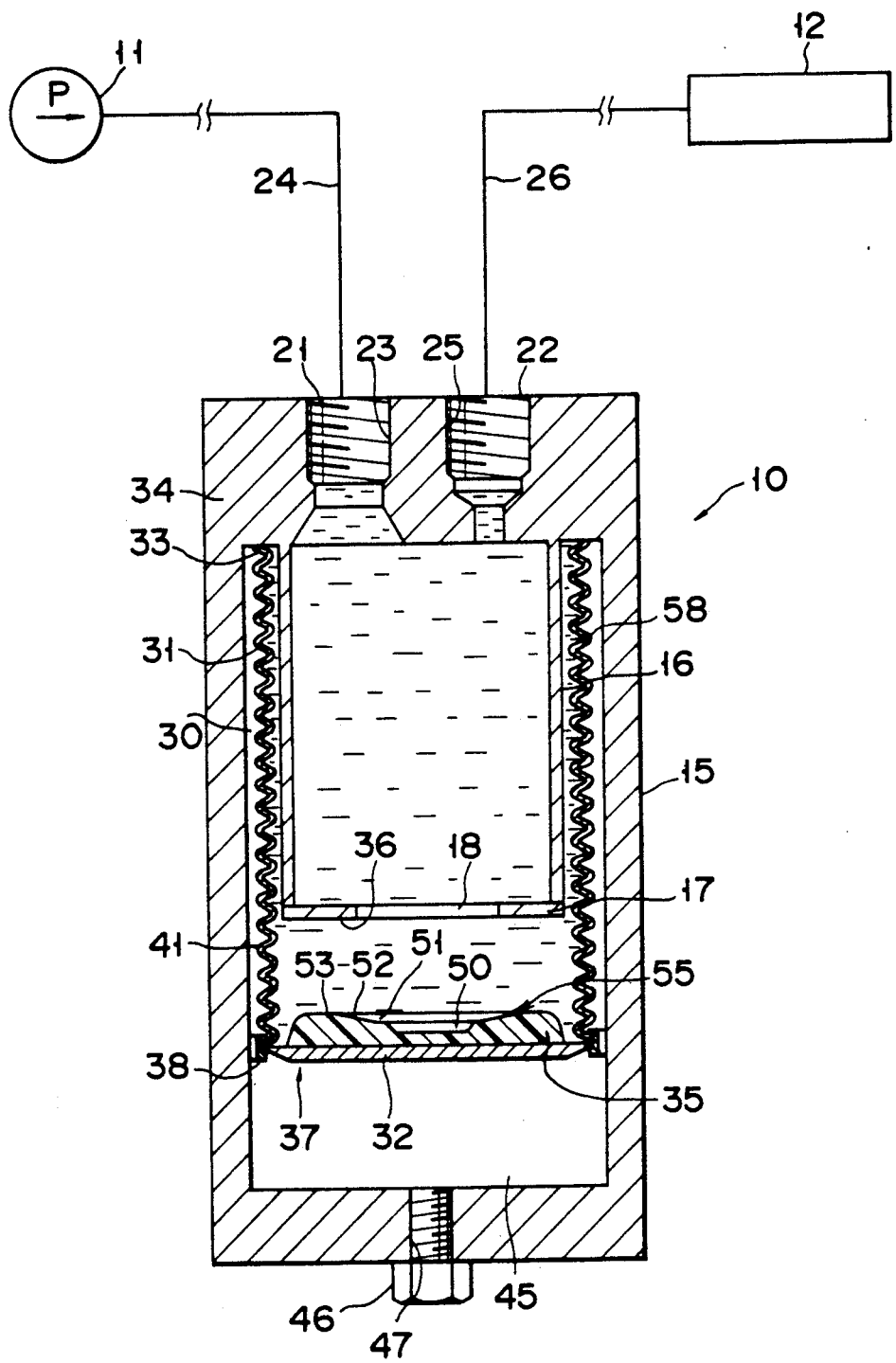
FIG. 1 is a longitudinal sectional view of an accumulator according to the first embodiment of the present invention.
Figure 2:
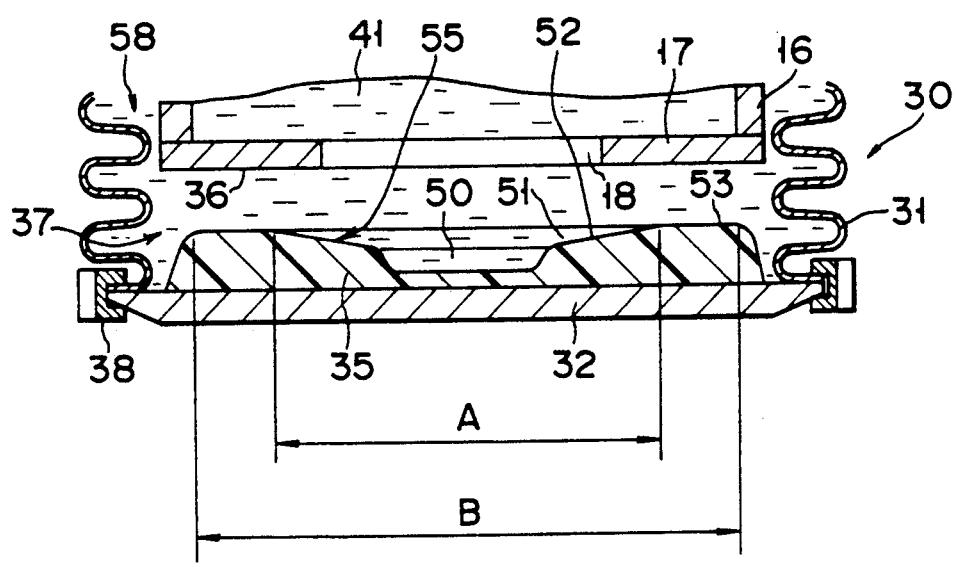
FIG. 2 is an enlarged sectional view of the self-seal mechanism employed in the accumulator shown in FIG. 1.

The first embodiment of the present invention will now be described, with reference to FIGS. 1-4. As is shown in FIG. 1, an accumulator 10 is located between a hydraulic pump 11 and a hydraulic device 12 to be operated by the pump 11. The accumulator 10 comprises a hollow housing 15, and an inner cylinder 16 is arranged inside the housing 15 to be concentric with the housing 15. A flow port 18 is formed in the center of an annular support seat 17 located at the lower end of the inner cylinder 16.

An inlet port 21 and an outlet port 22 are formed in the upper end portion of the housing 15. One end of an inflow pipe 24 is connected to the female screw 23 formed in the inlet port 21 by means of a pipe coupler (not shown), while the other end thereof is connected to the discharge port of the pump 11. One end of an outflow pipe 26 is connected to the female screw formed in the outlet port 22 by means of a pipe coupler (not shown), while the other end thereof is connected to the inlet port of the hydraulic device 12.

A metallic bellows 30 is located inside the housing 15. The bellows 30 includes a bellows body 31 which is expansible or compressible in the axial direction of the housing 15, and a bellows end plate 32 for closing the free end of the bellows body 31. The bellows body 31 has a predetermined accordion-like walls and is obtained by plastically working a thin stainless steel plate by hydraulic forming, roll forming, or the like. A metallic plate other than the stainless steel plate may be used for obtaining the bellows body 31. The bellows body 31 has a fixed end 33 which is located opposite to the free end. At this fixed end, the bellows body 31 is hermetically fixed to the end wall 34 of the housing 15.

An elastic seal member 35 is arranged on the bellows end plate 32 such that it is located within the inside of the bellows body 31. The seal member 35 is formed of a material having rubber-like elasticity, such as urethane elastomer or nitrile rubber. It is desirable that the seal member have a hardness in the range of durometer A type 70-95 prescribed in ASTM 2240. The seal member 35 is arranged to oppose the face 36 of the annular support seat 17. The bellows end plate 32, the elastic seal member 35, and the face 36 of the annular support seat 17 jointly constitute a seal mechanism 37, as will be described later.

A guide member 38 formed of resin is located around the bellows body 31. A plurality of such guide members 38 may be employed in accordance with the need. The purposes of employing the guide member(s) 38 are: to provide a predetermined clearance between the outer face of the bellows body 31 and the inner face of the housing 15; and to reduce the sliding friction between the bellows body 31 and the housing 15.

Of the internal spaces which the bellows 30 defines inside the housing 30, the space inside the bellows 30 is used as a liquid chamber 41. This liquid chamber 41 is filled with an oil. The space between the outer face of the bellows 30 and the inner face of the housing 15 is used as an gas chamber 45. An inert gas, such as nitrogen, is charged in this gas chamber 45. At this time, the inert gas is introduced through a gas supply port 47, which can be closed with a plug 46. The charging pressure of the gas is determined in accordance with e.g., the pulsation-absorbing characteristic of the accumulator 10. For example, the sealing pressure of the gas is several $kg/cm^2$ or higher. The gas sealed in the gas chamber 45 acts in such a manner as to compress the bellows 30.

The elastic seal member 35 employed in the embodiment looks like a disk, if viewed from above. It has a first depression 50 and a second depression 51 which are concentric with each other. The second depression 51 has a larger diameter than that of the first depression 50 and is shallower than the first depression 50. The bottom of that region of the second depression 51 which opposes the face 36 of the annular support seat 17 is defined by a slanted face 52, which is slanted such that the second depression 51 becomes shallower toward the outer periphery of the seal member 35. In the case of this embodiment, an annular flat face 53 is formed around the slanted face 52. The seal member 35 is adhered to the bellows end plate 32 by use of an adhesive or by vulcanization. Needless to say, the seal member 35 may be fixed to the bellows end plate 32 by use of a suitable method other than the adhesion.

Figures 3, 4:
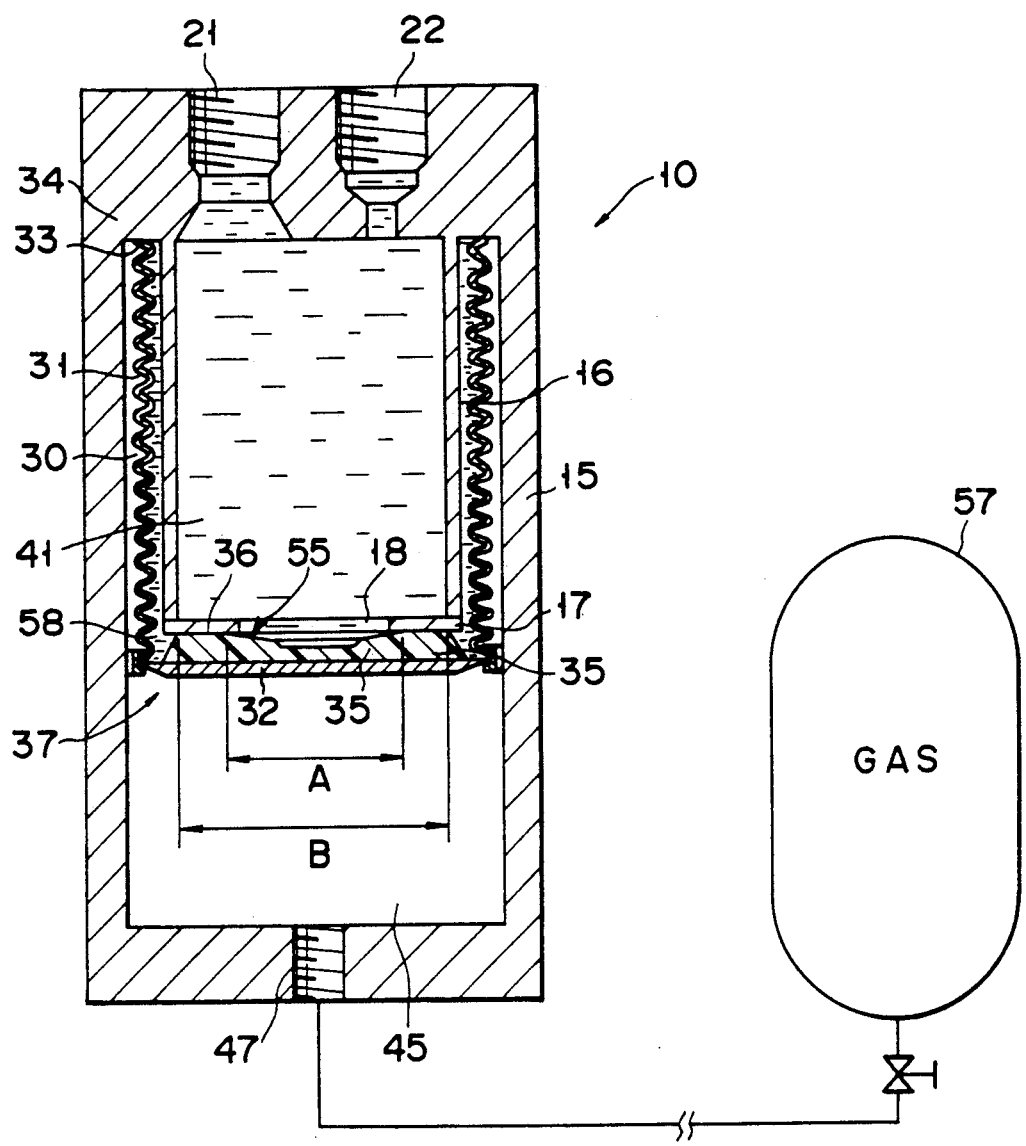
FIG. 3 is a sectional view illustrating the condition where a gas is supplied into the accumulator shown in FIG. 1.
FIG. 4 is an enlarged sectional view illustrating how the self-seal mechanism is when a gas is supplied into the accumulator shown in FIG. 1.

As is shown in FIG. 4, the flat face 53 of the elastic seal member 35 is in contact with the face 36 when the self-seal mechanism 37 is in the closed state. The contact region between the seal member 35 and the face 36 is annular. The slanted face 52, which defines the bottom of the second depression 51 located on the radially inner side of the flat face 53, is slanted such that the second depression 51 becomes deeper toward the first depression 50. When the self-seal mechanism 37 is in the closed state, therefore, a wedge-shaped liquid guide gap 55 is formed in the region where the elastic member 35 opposes the face 36 such that the liquid guide gap 55 extends along the circumference of the second depression 51. Accordingly, if the pressure of the oil introduced through the flow port 18 is applied to the liquid guide gap 55 in the closed state of the self-seal mechanism 37, the oil is made to flow in such a direction as will separate the seal member 35 and the face 36 from each other at the contact region.

The seal member 35 is required both to maintain a certain extent of elasticity and to provide easy separation from the face 36. In order to satisfy these requirements, it is desirable that the seal member 35 have a hardness in the range of durometer A type 70-95 prescribed in ASTM 2240. In addition, the size of the seal member 35 is determined such that the inner diameter A of the seal member portion which is brought into contact with the face 36 and the outer diameter B of the same seal member portion satisfy the relation $1.5 < (B/A) < 7.0$, more preferably the relation $2.0 < (B/A) < 3.5$. If the value of the B/A is smaller than 1.5, the pressure acting between the seal member 35 and the face 36 becomes too high, resulting in permanent deformation of the seal member 35. If the value of the B/A is larger than 7.0, it becomes harder for the oil to flow into the region between the seal member 35 and the face 36 when the self-seal mechanism is to be opened. As a result, the seal member 35 does not easily separate from the face 36.

The process in which a gas is introduced into the gas chamber 45 will now be described. Before the gas chamber 45 is charged with a gas, the liquid chamber 41 is filled with an oil. As is shown in FIG. 3, a compressed gas supply source 57 is connected to the gas supply port 47, so as to supply a compressed gas into the gas chamber 45. In accordance with an increase in the amount of gas supplied into the gas chamber 45, the bellows body 31 is compressed in the axial direction, with the oil in the oil chamber 41 being discharged from the housing 15. When the bellows 30 has been compressed to the predetermined stroke, the elastic seal member 35 is in tight contact with the face 36 of the annular support seat 17, so that the flow port 18 is closed. In this condition, the bellows cannot be compressed more, and part of the oil is confined to the backup liquid chamber 58 defined between the inner face of the bellows body 31 and the inner cylinder 16. (The backup liquid chamber 58 constitutes part of the liquid chamber 41.)

Since the gas supply into the gas chamber 45 continues after the elastic seal member 35 is brought into tight contact with the face 36, the pressure in the gas chamber gradually increases. The oil sealed in the backup liquid chamber 5 is substantially incompressible, so that the entire inner face of the bellows body 31 is uniformly supported by the oil sealed in the backup liquid chamber 58. Therefore, the bellows body 31 is prevented from being deformed beyond an allowable extent after the supply of the compressed gas is continued. Moreover, the seal member has a fat face 53 extending along the circumference thereof, so that the contact between the seal member 35 and the face 36 is plane contact. Accordingly, a very high pressure does not act on the elastic seal member 35. When the pressure in the gas chamber 45 has reached a predetermined value, the gas supply is stopped, and the gas supply port 47 is closed with the plug 46.

As is shown in FIG. 3, the self-seal mechanism 37 is in the closed condition after the gas is introduced into the accumulator 10 in the process mentioned above. In this condition, the hydraulic pump 11 shown in FIG. 1 is operated and a compressed oil is supplied into the interior of the housing 15 through the inflow pipe 24. As a result, the hydraulic pressure acts in the liquid guide gap 55 defined between the elastic seal member 35 and the face 36. Since the oil entering the liquid guide gap 55 flows in such a direction as will separate the seal member 35 from the face 36, the elastic seal member 35 can easily separate from the face 36 when the pressure in the oil chamber 41 becomes higher than the pressure in the gas chamber 45. Accordingly, the self-seal mechanism 37 is easily set in the open state as soon as the pump 11 is driven, as is shown in FIG. 1. The smaller the value of B/A is, the more easily the seal member 35 separates from the face 36. As was mentioned above, however, if the value of B/A is too small, a very high pressure acts between the seal member 35 and the face 36, so that the seal member 35 may be permanently deformed. Therefore, it is important to adjust the value of B/A to be larger than 1.5.

The oil introduced into the liquid chamber 41 by the pump is supplied to the hydraulic device 12 through the outlet port 22. The pulsation components of the oil pressure caused by the rotation of the pump 11 are first transmitted to the liquid chamber 41, and is then transmitted to the gas chamber 45 through the oil in the liquid chamber 41. Accordingly, the pulsation components are absorbed by the compression and expansion of the gas sealed in the gas chamber 45. When the gas chamber 45 is compressed, the bellows 30 is expanded. Conversely, when the gas chamber 45 is expanded, the bellows 30 is compressed. In this manner, a change in the volume of the oil supplied from the pump 11 is efficiently converted into a change in the volume of the gas in the gas chamber 45. Thus, the pulsation components of the oil are absorbed.

If the pressure in the liquid chamber 41 decreases for some reason or other, the bellows 30 is compressed due to the pressure of the gas sealed in the gas chamber 45. If the bellows 30 is compressed to the predetermined stroke, the seal member 35 is brought into tight contact with the face 36, thus closing the flow port 18. Accordingly, part of the oil is confined to the backup liquid chamber 58 defined between the inner cylinder 16 and the bellows body 31. Since the oil is substantially incompressible, the entire inner face of the bellows body 31 is uniformly supported from inside by the oil sealed in the backup liquid chamber 58. Thus, the bellows body 31 is prevented from being deformed excessively. Since, therefore, the bellows body 31 is not required to have a high degree of pressure resistance, it need not be very thick. Even if the bellows body 31 is thin, the metallic bellows 30 can exhibit a satisfactory gas barrier characteristic.

The shape of the elastic seal member 35 is not limited to that mentioned above. For example, the seal member 35 may have such shapes as are shown in FIGS. 5 and 7. In the seal member 35 shown in FIG. 5, the slanted face 52 declines from the outer periphery 35a of the seal member 35 toward the first depression 50. In other words, the bottom of the second depression 51 may be defined by such a slanted face. The state where the self-seal mechanism employing the elastic seal member shown in FIG. 5 is closed at the time of gas supply illustrated in FIG. 6. In the seal member 35 shown in FIG. 7, the bottom of the second depression 51 is defined by both a slated face 52 and a second flat face 59. In each of the cases shown in FIGS. 6 and 7, a wedge-shaped liquid guide gap 55 is defined between the seal member 35 and its opposite face 36 when the self-seal mechanism 37 is in the closed state, so that the oil is made to flow into the region between the seal member 35 and the opposite face 36.

Figure 8:
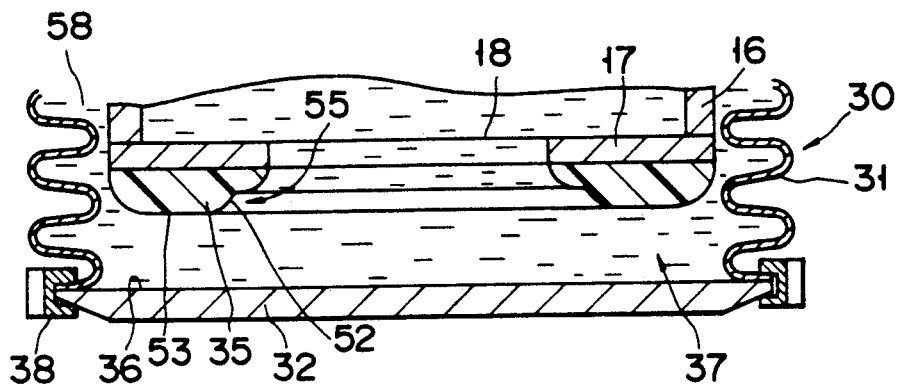

FIG. 8 illustrates a modification of the self-seal mechanism 37. In this modification, the annular elastic seal member 35 is provided for the support seat 17, not for the bellows end plate 32. In this modification, therefore, the face which the seal member 35 opposes is part of the bellows end plate 32.

Figure 9:
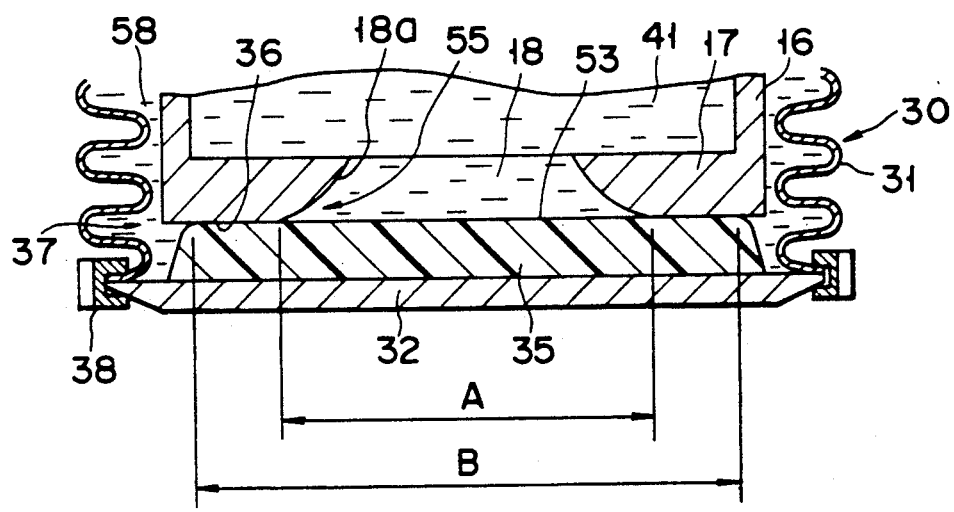

FIG. 9 illustrates another modification of the self-seal mechanism 37. In this modification, the inner circumferential wall 18a of the flow port 18 is slanted or curved such that the inner diameter of the flow port 18 is increased toward the seal member 35. When the self-seal mechanism 37 is in the closed state, a liquid guide gap 55 is formed between the seal member 35 and its opposite face 36 such that the liquid guide gap 55 extends along the entire circumference of the flow port 18.

Figure 10:
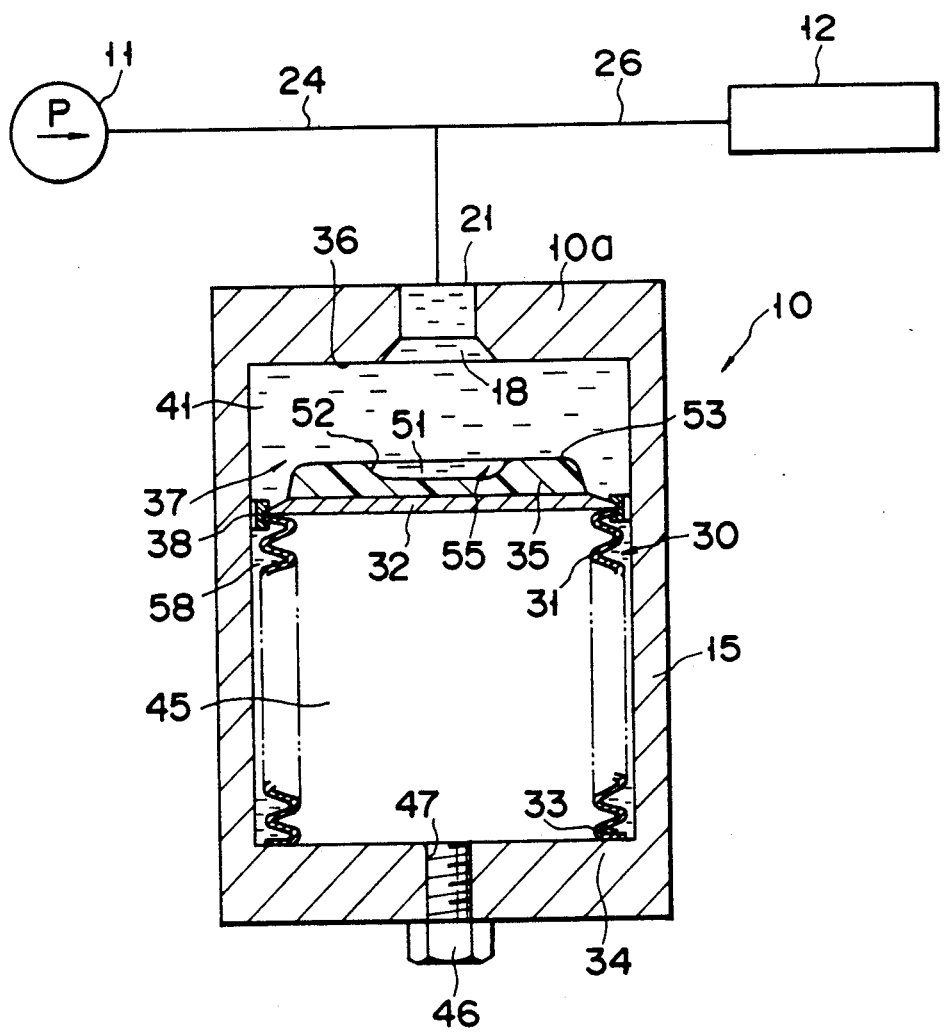
FIG. 10 is a sectional view of an accumulator according to the second embodiment of the present invention.

FIG. 10 shows the second embodiment of the present invention. In the second embodiment, a liquid chamber 41 is defined outside the bellows 30, and a gas chamber 45 is defined inside the bellows 30. An elastic seal member 35, whose material and shape are similar to those of the elastic seal member of the foregoing embodiment, is provided on that side of the bellows end plate 32 which opposes the flow port 18. This flow port 18 is formed in the center of a support seat 10a.

Figure 11:
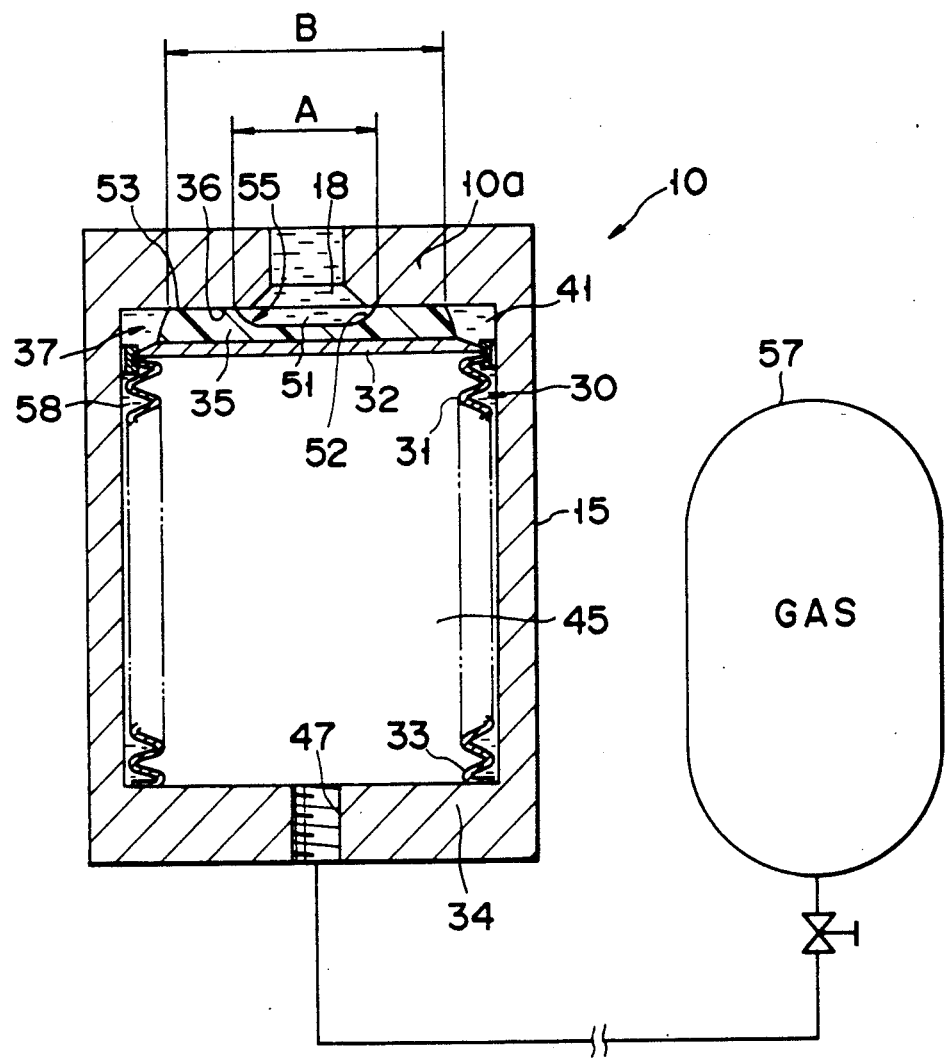
FIG. 11 is a sectional view illustrating how the accumulator shown in FIG. 10 is at the time of gas introduction.

A gas is introduced into the accumulator 10 of the second embodiment in a similar process to that of the first embodiment. As is shown in FIG. 11, a compressed gas supply source 57 is connected to the gas chamber 45 shown in FIG. 11, so as to supply a compressed gas into the gas chamber 45. When the pressure in the gas chamber 45 has reached a predetermined value, the self-seal mechanism closes, with the result that an oil is sealed in a backup liquid chamber 58. Due to the oil sealed in the backup liquid chamber 58, the bellows body 31 is prevented from being excessively deformed.

The seal member 35 employed in the second embodiment has a depression 51 opposing the face 36. The depression 51 is concentric with the seal member 35 and looks circular if viewed from above. When the seal member 35 abuts the corresponding face 36, the slanted face 52 of the depression 51 defines a liquid guide gap 55 in the region where the seal member 35 and the corresponding face 36 are brought into tight contact with each other. In the closed state of the self-member 37, therefore, the seal member 35 can easily separate from the face 36, as soon as an oil having a higher pressure than that of the gas sealed in the gas chamber 45 is introduced through the flow port 18. As a result, The self-seal member 37 can quickly change from the closed state to the open state.

Figure 12:
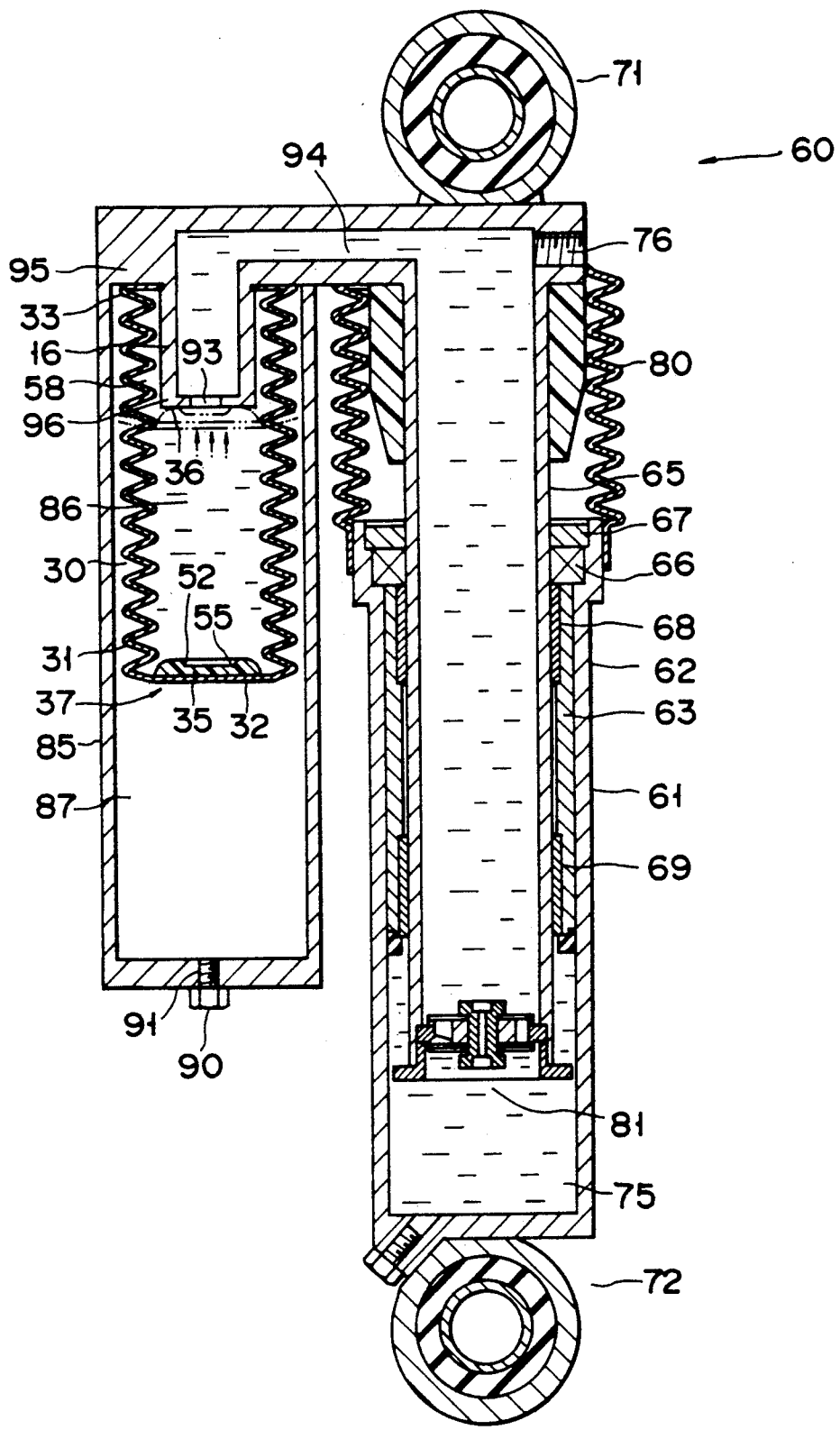
FIG. 12 is a vehicle suspension system employing an accumulator according to the third embodiment of the present invention.

FIG. 12 shows the third embodiment of the present invention.

This embodiment concerns a case where the metallic bellows 30 mentioned above is incorporated in a hydropneumatic suspension system 60 for a motor vehicle. The suspension system 60 comprises a first housing 61. This first housing 61 is made up of an outer cylinder 62 and an inner cylinder 63, and a hollow rod 65 is slidably inserted into the housing 61. An oil seal 66, a seal-fixing member 67, and bearings 68 and 69, etc. are provided for the housing 61. The upper end of the rod 65 is coupled to a vehicle member (not shown) by use of a coupling member 71. The lower end of the housing 61 is coupled to an axle member by use of a coupling member 72. A liquid chamber 75 is defined in the interior of the housing 61, and is filled with an oil. A liquid supply port 76, which is used for supplying an oil into the liquid chamber 75, is connected to a hydraulic circuit (not shown).

The sliding portions between the rod 65 and the housing 61 are surrounded by a dust cover 80 which is in the form of a bellows. A damping force-generating mechanism 81 is provided at the lower end of the rod 65.

The suspension system 60 also comprises a second housing 85. The interior of this housing 85 is partitioned by a metallic bellows 30 into a liquid chamber 86 and a gas chamber 87. An inert gas, such as nitrogen, is sealed in the gas chamber 87. At this time, the gas is introduced through a gas supply port 91, which can be closed with a plug 90. The charging pressure of the gas is, for example, several tens of kg/cm$^2$ or higher, and acts in such a manner as to compress the bellows 30. The liquid chamber 86 of the second housing 85 communicates with the liquid chamber 75 of the first housing 61 through both a flow port 93 and a flow path 94. The flow port 93 is formed in the center of a support seat 96 which is like a cylindrical projection.

As in the foregoing embodiments, the bellows 30 of the third embodiment includes: a bellows body 31 which is expansible or compressible in the axial direction of the housing 85; and a bellows end plate 32 which closes one end of the bellows body 31. The bellows body 31 is obtained, for example, by plastically working a thin stainless steel plate. A metallic plate other than the stainless steel plate may be used for obtaining the bellows body 31. The other end of the bellows body 31 is hermetically fixed to the end wall 95 of the housing 85.

An elastic seal member 35, which is similar to those employed in the first and second embodiments, is formed on the inner side of the bellows end plate 32. An annular face 36 corresponding to the elastic seal member 35 is formed around the flow port 93. The seal member 35 and the corresponding face 36 jointly constitute a self-seal mechanism 37.

The process in which a gas is introduced into the gas chamber 87 of the suspension system 60 is similar to the processes of the first and second embodiments mentioned above. Specifically, the liquid chamber 86 is filled with an oil before the gas chamber 8 is charged with a gas. When the self-seal mechanism 37 has been closed as a result of the gas charge, part of the liquid is confined to the backup liquid chamber 58 defined between the inner cylinder 16 and the bellows body 31, so that the bellows 30 is supported by the liquid confined to the backup liquid chamber 58. Accordingly, the bellows 30 is prevented from being excessively deformed. In the third embodiment as well, a wedge-shaped liquid guide gap 55 is produced between the slanted face 52 of the seal member 35 and the corresponding face 36.

After the gas is supplied as above, a high pressure liquid is introduced into the self-seal mechanism 37 through the flow port 93. Part of the high pressure liquid introduced into the liquid guide gap 55 flows in such a manner as to separate the elastic seal member 35 and the corresponding face 36 from each other. If the pressure of the liquid introduced into the liquid guide gap 55 is higher than the pressure of the gas sealed in the gas chamber 87, the elastic seal member 35 can instantaneously separate from the corresponding face 36. As a result, the seal-seal mechanism 37 can be quickly set in the closed condition.

As mentioned above, the bellows body 31 is prevented from being excessively deformed at the time of gas introduction since the self-seal mechanism 37 is closed then. If, in the closed state of the self-seal mechanism, the hydraulic pressure becomes higher than the pressure in the gas chamber 87, the oil introduced into the liquid guide gap 55 acts in such a manner as to raise the seal member 35. Accordingly, the seal member 35 is prevented from clinging to the corresponding face 36.

The suspension system 60 mentioned above is installed to a vehicle. If, in the installed state, the first housing 61 is pushed into the hollow rod 65, the gas in the gas chamber 87 is compressed further, thus increasing the repulsive force of the gas. In addition, the bellows 30 expands in the axial direction in accordance with a change in the pressure of the gas. Conversely, if the rod 65 slides in such a direction as to project from the housing 61, the volume of the gas sealed in the gas chamber 87 increases and the bellows 30 is compressed. Since the oil flows through the damping force-generating mechanism 81 in this state, the movement of the rod 65 is restricted. Accordingly, the suspension system 60 achieves both a gas spring function and a shock absorber function.

Additional advantages and modifications will readily occur to those skilled in the art. Therefore, the invention in its broader aspects is not limited to the specific details, and representative devices, shown and described herein. Accordingly, various modifications may by without departing from the spirit or scope of the general inventive concept as defined by the appended claims and their equivalents.

What is claimed is:

1. An accumulator comprising:
   a hollow housing;
   a bellows located inside the housing, said bellows including:
   a bellows body having a first end and a second end, said first end being secured to the housing and said second end being allowed to move in an axial direction of the housing; and
   a bellows end plate for closing the second end of the bellows body;
   a liquid chamber defined by an inner face of the bellows and filled with a liquid;
   a gas chamber defined by an outer face of the bellows and charged with a compressed gas;
   an annular support seat opposing the bellows end plate, said support seat having a flow port communicating with the liquid chamber and allowing the liquid in the liquid chamber to pass therethrough when the bellows is compressed or expanded;
   a self-seal mechanism for closing the flow port when the pressure of the compressed gas charged in the gas chamber causes the bellows to be deformed in the axial direction to a predetermined extent, part of the liquid in the liquid chamber being confined to a region inside the bellows when the self-seal mechanism is closed;
   said self-seal mechanism including:
   an elastic seal member formed of a rubber-like elastic material and provided for one of the support seat and the bellows end plate; and
   a face which the elastic seal member opposes, those portions of the elastic seal member and the face which oppose each other are shaped in such a manner as to produce a liquid guide gap that causes part of the pressurized liquid introduced through the flow port to flow into a region between the elastic seal member and the face when the elastic seal member is in contact with the face.

2. An accumulator according to claim 1, wherein said liquid guide gap has a wedge-shaped cross section, so that the distance between the elastic member and the face decreases from the center of the elastic seal member to the outer periphery of the elastic seal member.

3. An accumulator according to claim 1, wherein said elastic seal member has a slanted face which is continuous in a circumferential direction of the seal member and which is so slanted as to increase the thickness of the seal member from the center to the outer periphery, said liquid guide gap being produced between the slanted face and the face.

4. An accumulator according to claim 1, wherein said elastic seal member has:
   a slanted face which is continuous in a circumferential direction of the seal member and which is so slanted as to increase the thickness of the seal member from the center to the outer periphery; and
   an annular flat face which is continuous in the circumferential direction of the seal member and which is located between the slanted face and the outer periphery, said annular flat face being brought into contact with the face.

5. An accumulator according to claim 1, further comprising an inner cylinder located inside the bellows, said support seat being provided for one end of the inner cylinder.

6. An accumulator according to claim 1, wherein said elastic seal member is provided for the bellows end plate.

7. An accumulator according to claim 1, wherein said elastic seal member is provided for the support seat.

8. An accumulator according to claim 1, wherein said elastic seal member has a circular planar shape and includes an annular swelling portion to be brought into contact with the face, said annular swelling portion having a size satisfying the relations of $1.5 < B/A < 7.0$, where A denotes the inner diameter of the annular swelling portion and B denotes the outer diameter of the annular swelling portion.

9. An accumulator comprising:
   a hollow housing;
   a bellows located inside the housing, said bellows including:
   a bellows body having a first end and a second end, said first end being secured to the housing and said second end being allowed to move in an axial direction of the housing; and
   a bellows end plate for closing the second end of the bellows body;
   a liquid chamber defined by an outer face of the bellows and filled with a liquid;
   a gas chamber defined by an inner face of the bellows and charged with a compressed gas;
   an annular support seat opposing the bellows end plate, said support seat having a flow port communicating with the liquid chamber and allowing the liquid in the liquid chamber to pass therethrough when the bellows is compressed or expanded;
   a self-seal mechanism for closing the flow port when the pressure of the compressed gas charged in the gas chamber causes the bellows to be deformed in the axial direction to a predetermined extent, part of the liquid in the liquid chamber being confined to a region outside the bellows when the self-seal mechanism is closed;
   said self-seal mechanism including:
   an elastic seal member formed of a rubber-like elastic material and provided for one of the support seat and the bellows end plate; and
   a face which the elastic seal member opposes, those portions of the elastic seal member and the face which oppose each other are shaped in such a manner as to produce a liquid guide gap that causes part of the pressurized liquid introduced through the flow port to flow into a region between the elastic seal member and the face when the elastic seal member is in contact with the face.

10. An accumulator according to claim 9, wherein said elastic seal member has a circular planar shape and includes an annular swelling portion to be brought into contact with the face, said annular swelling portion having a size satisfying the relations of $1.5 < B/A < 7.0$, where A denotes the inner diameter of the annular swelling portion and B denotes the outer diameter of the annular swelling portion.

* * * * *